July 21, 1959

F. B. BERGER ET AL 2,896,162

HETERODYNE AUTOCORRELATOR

Filed Oct. 30, 1953

INVENTOR.
FRANCE B. BERGER
EARL G. NEWSOM
BY

ATTORNEY.

July 21, 1959  F. B. BERGER ET AL  2,896,162
HETERODYNE AUTOCORRELATOR
Filed Oct. 30, 1953                    2 Sheets-Sheet 2
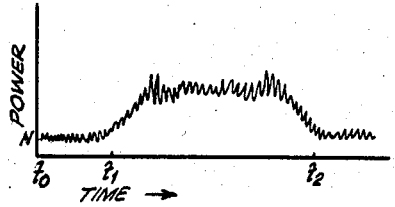
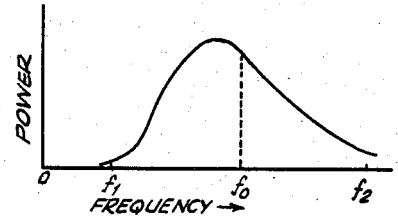
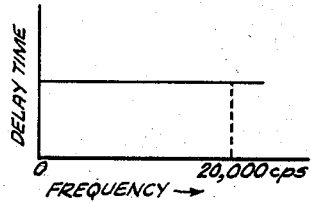
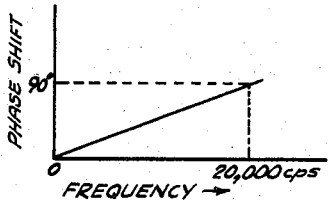
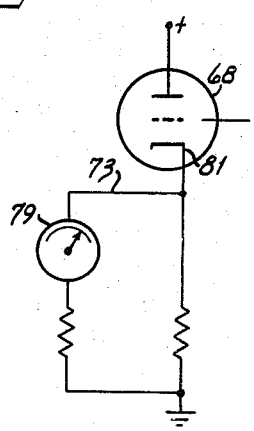
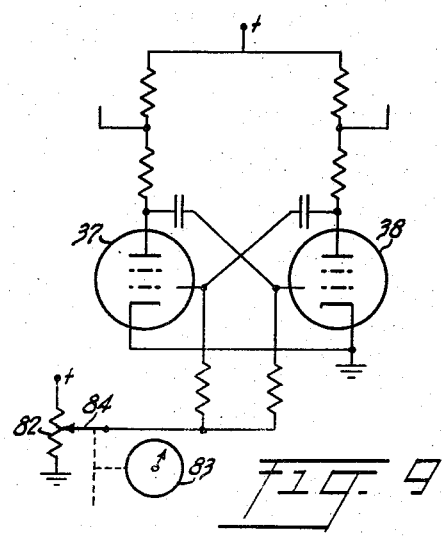
INVENTOR.
FRANCE B. BERGER
EARL G. NEWSOM
BY
ATTORNEY.

United States Patent Office 2,896,162
Patented July 21, 1959

2,896,162

HETERODYNE AUTOCORRELATOR

France B. Berger, Pleasantville, and Earl G. Newsom, Thornwood, N.Y., assignors to General Precision Laboratory Incorporated, a corporation of New York Application October 30, 1953, Serial No. 389,292

8 Claims. (Cl. 324—79)

This invention relates to frequency measuring devices and more particularly to electronic devices for measuring the median frequency of a broad spectrum of frequencies in the presence of noise. The invention specifically relates to devices in which the autocorrelation principle is employed in manual or automatic circuits for the measurement of frequency.

By autocorrelation is meant the comparison of a function with itself. More precisely an autocorrelation function is the time average of the product of a function by the same function shifted in phase. The autocorrelation procedure is useful in measuring frequency because, when the phase shift is one-quarter cycle, or in general any odd integral multiple thereof, the autocorrelation function approaches zero in value.

While the autocorrelation method of measuring frequency is indirect and is not of great service in measuring single-frequency signals in comparison with the usual direct methods, autocorrelation is of great service when the measured signal contains a mixture of alternating signals of different frequencies; that is, when the input signal has a wide frequency spectrum. In such cases the autocorrelation method provides a good measurement of the median spectrum frequency. This measurement, although difficult by more usual means, is relatively simple by the use of autocorrelation. No matter what form the frequency function of the input signal may take, the autocorrelation method provides an indication of the median frequency of the spectrum.

In one means of accomplishing measurement of median frequency by autocorrelation, the input signal is heterodyned to another frequency by an adjustable heterodyne oscillator. The heterodyned signal is applied both directly and through a fixed time delay to a mixer or modulator which multiplies its two inputs to produce a product output. This output is integrated to form an error signal which ideally becomes zero when the fixed delay time is one-quarter cycle. The error signal is then employed to control the frequency of the heterodyning oscillator in such direction as to make the heterodyned signal period length exactly four times the length of the fixed delay time, bringing the error signal to zero. Thus a measure of the median frequency is secured. Alternatively this frequency measuring action can be accomplished manually by manipulating the heterodyning oscillator frequency to bring the error signal to zero. In either case an indicator connected to the heterodyning oscillator controls indicates to a suitable scale the median frequency of the input signal spectrum.

It is obvious that the median frequency of a signal spectrum is a statistical concept, and that the exact value of the median frequency depends upon the time duration of the measurement. Therefore the time of integration is important. It is found, however, that relatively short integration time suffices to provide very useful measurements and that for signal spectra in the audible range, to which this invention has been applied, the time over which integration must be effected is, practically speaking, negligibly short.

One object of this invention is to provide an autocorrelator having an adjustable generator for measuring the frequency of any varying signal.

Another object of this invention is to provide an autocorrelator having an adjustable generator and fixed time delay for measuring the median frequency of any alternating current signal spectrum.

Still another object of this invention is to provide an autocorrelator having a fixed time delay and an automatically adjustable generator for measuring the median frequency of a changing alternating current signal spectrum.

A further understanding of this invention may be secured from the detailed description and drawings, in which:

Figures 2, 3, 6 and 7 are graphs illustrating autocorrelator operation.

Figures 8 and 9 are diagrams of the circuit changes required to convert the autocorrelator of Fig. 5 into a manually operated frequency-measuring autocorrelator.

Figure 1:
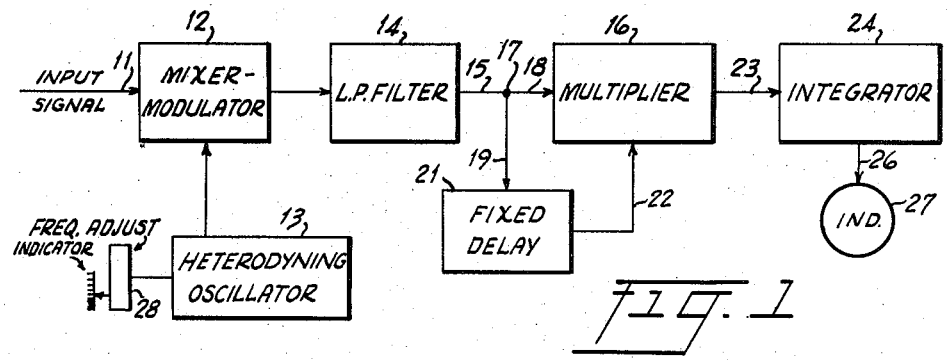
Figure 1 is a functional diagram of a frequency-measuring manually operated autocorrelator having fixed time delay.

Referring now to Fig. 1, an electrical input signal is applied through conductor 11 to a mixer-modulator 12. This electrical signal is alternating or varying and in general may vary at any frequency or may embrace a spectrum of frequencies, but for definiteness in this example the signal is in the audio range and has a frequency spectrum width of about 15% of its median frequency, $f_0$. This signal may originate as a mechanical, acoustic, or other type of vibration but must be converted into a varying electrical current for application to the circuits of this invention.

A received pulse radar signal from a target moving relative to the transmitter-receiver after demodulation may be taken as an example of an electrical signal suitable for application to the circuit of Fig. 1. In Fig. 2 such a signal is indicated, representing a single demodulated pulse containing a variety of frequencies extending over a relatively wide spectrum and mixed with noise which assumes the level N in the intervals between received pulses. When the signal is replotted by the Fourier method to a power versus frequency graph it appears as in Fig. 3 with the frequency range $f_2-f_1$ about 15% of $f_0$, the median frequency.

The mixer modulator 12, Fig. 1, receives in addition to the input signal applied to conductor 11, a heterodyning signal from an adjustable heterodyning oscillator 13 and, multiplying these two inputs together, produces upper and lower sidebands having frequencies equal to the sum and difference of the input frequencies. As a convenience in instrumentation, employment of the lower sideband is preferred, discarding the upper sideband. The lower sideband frequency is defined by $f_L$ in the equation $$f_h - f_0 = f_L$$

in which $f_h$ is the heterodyning frequency. As a numerical example, if $f_0$ is 4000 c.p.s. and $f_h$ 24,000 c.p.s., $f_L$ is 20,000 c.p.s.

The modulation products are passed through a low-pass filter 14 which rejects the upper sideband frequencies but passes the lower sideband frequencies through conductor 15 to a multiplier 16. The conductor 15 is divided at junction 17, one branch 18 applying the in-phase signal to multiplier 16 while the other branch 19 applies the signal to a fixed-time delay device 21 and from it through conductor 22 to the multiplier 16.

The fixed-time delay device 21 can be of any one of a large number of types such as a passive delay network, an acoustical transmission line with transducers at both ends, a mechanical vibration transmission path, or a rotating magnetic drum delay device. In any case a delay device with electrical inputs and outputs is necessary.

The multiplier may be of any type performing the mathematical operation of multiplication and in general consists of any modulator or mixer-modulator. The output is an electrical voltage having a magnitude representing the input magnitude multiplied by itself displaced in phase. This displacement, being specific in time, is one-quarter period at a particular frequency.

The multiplier output is applied through conductor 23 to an integrator 24. This integrator may be of any type but preferably has a relatively long time constant, so that relative to the times of the momentary and noise-like fluctuations in the input signal its period appears to be nearly infinite. The integrator is conveniently of the type having a direct current electrical output at conductor 26, which is connected to an electrical indicator 27.

In operation, the manual adjustment 28 of the heterodyning oscillator 13 is adjusted until the reading of indicator 27 does not drift. At this adjustment one-quarter cycle of the frequency $f_0$ has become equal to the fixed-time delay of device 21, and for that component $f_0$ of the input signal the integrated output at conductor 26 of multiplier 16 has become zero. Frequencies above $f_0$ produce an effect in the multiplier opposite to that produced by frequencies below $f_0$, so that the net effect approaches zero, and for an infinite integration time in the absence of noise would equal zero. In the presence of high noise levels, or more precisely at low signal-to-noise ratios the output may not drop to near zero at any value of the heterodyning frequency, in which case $f_0$ is indicated by minimum output and not by zero or nearly zero output. The manual adjustment 28 is calibrated in terms of input frequency and thus indicates $f_0$ directly.

A very slight change in Fig. 1 makes its operation automatic and represents some change in its principles of operation, although the basic principle of this invention, the application of autocorrelation employing fixed-time delay to frequency measurement, is unchanged. The automatic circuit is depicted in Fig. 4.

In this circuit the input signal impressed on conductor 11 is applied to mixer-modulator 12, which also receives a heterodyning signal from heterodyning oscillator 29. The mixer-modulator output is applied through filter 30 and conductor 31 to the fixed-time delay circuit 21 which applies outputs differing in phase by a fixed time to the multiplier 16 through conductors 18 and 22. In this circuit unlike that of Fig. 1, the inputs 18 and 22 for the multiplier 16 are shown as derived from spaced terminals on the delay line 21 which terminals are distinct from its input terminal. In this manner it is emphasized that it is the phase difference of the inputs to the multiplier relative to each other which is of importance rather than the difference of either relative to any other potential point, as for example, the output 31 of the filter 30. The output of multiplier 16 is applied through conductor 23 to integrator 24. The integrated output is applied through conductor 26 both to a frequency indicator 32 and to the control of heterodyne oscillator 29.

In operation, the indicator 32 does not indicate a minimum or zero at null but indicates a voltage representing the median frequency $f_0$. This voltage also controls the output frequency of heterodyne oscillator 29 by controlling its grid bias.

Figure 4:
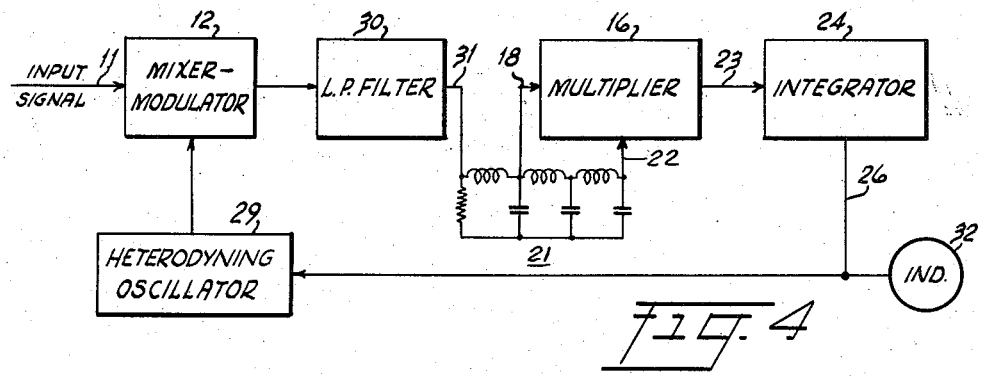
Figure 4 is a functional diagram of a frequency-tracking and measuring autocorrelator having fixed time delay.
Figure 5:
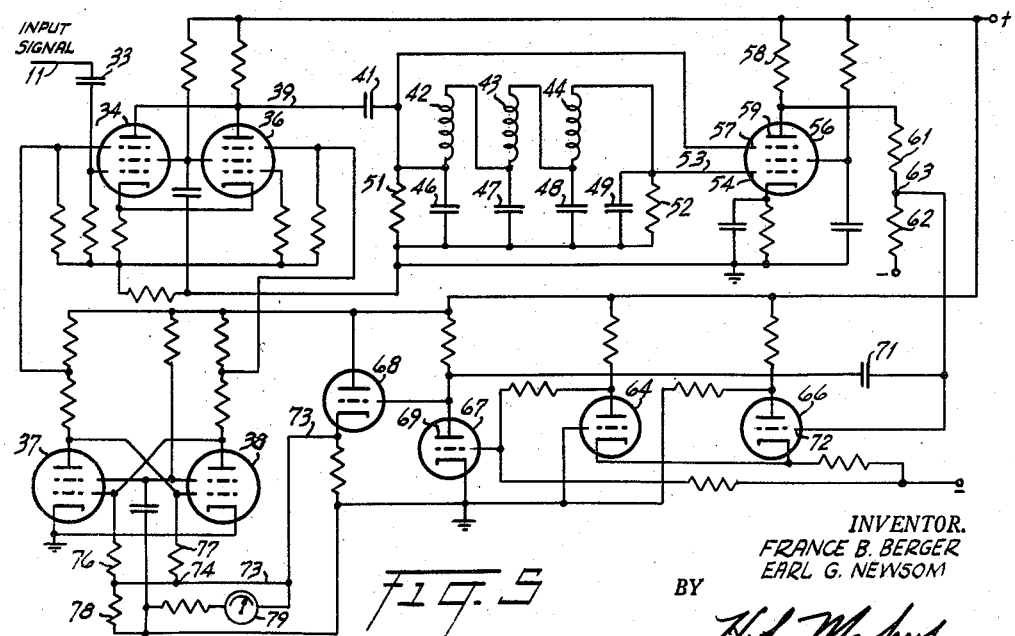
Figure 5 is a circuit diagram of an automatic autocorrelator having fixed time delay.

A preferred instrumentation of the frequency tracker of Fig. 4 is indicated in Fig. 5. The input signal is applied through conductor 11 and coupling condenser 33 to a mixer-modulator comprising pentodes 34 and 36. This mixer-modulator is also supplied with square wave heterodyning potential from an oscillator comprising beam power tetrodes 37 and 38. The mixer-modulator emits an output from its paralleled plate conductor 39 containing sum and difference frequencies but containing neither input frequency. Let it be supposed that the input spectrum has a median frequency of 4000 c.p.s. and the heterodyning frequency is 24,000 c.p.s. The sum and difference frequencies of 20,000 c.p.s. and 28,000 c.p.s. then appear at conductor 39 but the input frequencies of 4000 and 24,000 are absent. Conductor 39 is coupled through condenser 41 to a passive delay line comprising series inductances 42, 43 and 44 together with shunt capacitances 46, 47, 48 and 49 and terminating resistors 51 and 52. This delay line is designed to have a sharp cutoff just above the difference frequency of 20,000 c.p.s., thus not passing any higher frequencies than 20,000 c.p.s. and rejecting the sum frequency of 28,000 c.p.s. The delay line thus serves as a low pass filter. The amount of delay at 20,000 c.p.s. is made equal to one-quarter period of an oscillation having a frequency of 20,000 c.p.s., or 12.5 microseconds. This delay line is not adjustable, and the delay time for a network of this type is constant over a wide frequency range, as indicated in Fig. 6. It follows that the phase shift in angular measure is a linear function of frequency. This is indicated in Fig. 7, in which a phase shift of one-quarter cycle is indicated as occurring when the frequency of the energy applied to the circuit is exactly 20,000 c.p.s.

The output of the delay network is applied through conductor 53 to the first grid 54 of a pentode tube 56. This pentode is of the 6L7 type which can be controlled by voltage on either the first or third grid, and which therefore has a plate current that is proportional to the product of the voltages applied to the first and third grids. Voltage from the coupling condenser 41 is applied to the third grid 57; therefore the plate voltage representing the voltage drop in the plate resistor 58 caused by plate current represents the product of the signal voltages before and after passing through the time delay network.

The pentode multiplier plate 59 is connected through bleeder resistors 61 and 62 to negative potential and output is taken from the common terminal 63. This output is applied to an integrating amplifier comprising a first balanced stage employing triodes 64 and 66, a second stage using one triode 67, and a cathode follower final stage 68. The plate 69 of triode 67 is connected through a large condenser 71 to the amplifier input grid 72, constituting a Miller integrating feedback connection. The output voltage at conductor 73 has had most of the input fluctuations smoothed out and accurately represents the integral of the input voltage. This output conductor 73 is connected at 74 to the junction of grid bias resistors 76, 77 and 78 of the oscillator, so that the oscillator grid bias is partly determined by the voltage applied through conductor 73. This voltage is also indicated on a voltmeter 79. It is proportional to the median frequency of the spectrum applied to input conductor 11 and constitutes the output data of the autocorrelator circuit.

In operation, when both signals applied to multiplier 56 are zero the plate bleeder adjustment causes the potential at terminal 63 to be that of ground. The integrating amplifier is so adjusted that, when this potential exists at the input grid 72, the output potential is practically unchanging. When now an input signal spectrum is applied at conductor 11, a difference frequency which in general is different from 20,000 c.p.s. will be applied to the delay line and output frequencies differing in phase by an amount in general differing from 90° will be applied to grids 54 and 57 of the multiplier 56. The multiplier output will then produce a voltage different from ground potential at terminal 63 and integrator grid 72. If, for example, the input median frequency is 4000 c.p.s. and the oscillator is adjusted to emit a frequency of 23,000 c.p.s., the sideband frequency of 19,000 c.p.s. will be generated and applied to the multiplier both directly and through the delay line, where it suffers a delay of 12½ µs. This delay is less than one-quarter cycle at 19,000 c.p.s., so that a below-ground direct voltage is generated and applied to integrator grid 72 representing by its magnitude the difference between 19,000 c.p.s. and 20,000 c.p.s. and by its sense the fact that the difference is negative. This results in a positive voltage change at output conductor 73 which is applied to the oscillator cathodes, increasing the oscillator output frequency toward 24,000 c.p.s. and reaching it at the null condition when the input grid 72 has attained ground potential.

If the conductor 73 be broken and an indicator and manual control added, the autocorrelator principle is retained but the circuit is manually operable in accordance with the functional diagram of Fig. 1. This is effected by retaining the indicating voltmeter 79 as indicated in Fig. 8 to indicate the voltage of the cathode 81 of cathode follower triode 68, Figs. 5 and 8, by removing conductor 73, and by adding a manual grid bias control voltage divider 82, Fig. 9, to the oscillator tubes 37 and 38. It it also necessary to add an indicator 83 to the voltage divider slider 84 to indicate the oscillator output frequency or by scale calibration the input signal median frequency. The indicator 83 is required because the cathode voltage indicator 79, Fig. 8, in manual operation merely serves to show by its stationary indication that the null adjustment has been attained.

What is claimed is:

1. An autocorrelator for measuring frequency comprising, a multiplier, fixed-time delay means having electrical input and output terminals, an electrical mixer, an adjustable heterodyning generator having its output connected to said mixer, means for applying a varying electrical signal to said mixer, means for applying the product of said mixer to said multiplier both directly and through said fixed-time delay means, means for integrating the output of said multiplier and means for indicating the adjustment of said heterodyning generator.

2. An electrical autocorrelator frequency indicator comprising, a calibrated adjustable heterodyne frequency changer including means for the application thereto of a varying electrical signal the median frequency of variation of which is to be measured, fixed-time delay means, a multiplier, means for applying the output of said frequency changer to said multiplier through two paths one of which includes said fixed-time delay means, whereby the output product of said multiplier represents the product of said frequency changer output multiplied by itself delayed in phase by a fixed-time delay, and means including integrating means for indicating the time-averaged amplitude of the output product of said multiplier, whereby when the rate of change of said time-averaged amplitude is zero the calibration of said frequency changer indicates said median frequency.

3. An autocorrelator for indicating the median frequency of an electrical signal having a broad frequency spectrum comprising, a frequency changer including a mixer and a calibrated manually adjustable heterodyning oscillator, means for applying said electrical signal to be measured to said mixer, a multiplier, circuit means including a fixed-time delay means interconnecting the output of said mixer and the input of said multiplier for applying to said multiplier a pair of signals whose waveform is identical to the output of said mixer but whose relative phases differ by the fixed time of said delay means, and means including integrating means for indicating the time-averaged amplitude of the output product of said multiplier, whereby at the minimum value of said time-averaged amplitude the calibration of said calibrated adjustable heterodyning oscillator indicates said median frequency.

4. An autocorrelator for indicating the median frequency of a varying electrical signal comprising, a calibrated adjustable heterodyne frequency changer having said varying electrical signal applied thereto, a multiplier, circuit means including fixed-time delay means interconnecting the output of said frequency changer and the input of said multiplier for applying to said multiplier a pair of signals whose waveform is identical to the output of said frequency changer but whose relative phases differ by the fixed-time delay of said delay means, an averaging device connected to said multiplier for averaging the output magnitude thereof over a selected period of time, means for applying the output of said averaging device to control the output frequency of said frequency changer in such direction as to reduce the rate of change of said averaged output, and means for indicating the output of said averaging device.

5. An autocorrelator for indicating the median frequency of an electrical signal having a broad frequency spectrum comprising, a frequency changer including a mixer and a calibrated adjustable heterodyning oscillator, means for applying said electrical signal to said mixer, a multiplier, circuit means including fixed-time delay means interconnecting the output of said mixer and the input of said multiplier for applying to said multiplier a pair of signals whose waveform is identical to the output of said mixer but whose relative phases differ by the fixed-time delay of said delay means, integrating means for integrating the output of said multiplier, circuit means for controlling and adjusting the frequency of said heterodyning oscillator, by the output of said integrating means, and means for indicating the output of said integrating means.

6. An autocorrelator for indicating the median frequency of an electrical signal having a broad frequency spectrum comprising, a balanced mixer, means for applying said electrical signal to said mixer, an adjustable multivibrator oscillator having direct current positive grid bias frequency control, circuit means applying the oscillations of said oscillator to said mixer to form heterodyned products including a difference frequency signal, a time-delay line including a pair of terminals having a fixed-time delay therebetween, means for applying the output of said mixer to said time-delay line, a multiplier, circuit means for applying signals existing at each of said pair of terminals to said multiplier, an integrator connected to said multiplier for integrating the output thereof, means indicating the output of said integrator, and calibrated means for manually controlling the bias of said multivibrator oscillator.

7. An autocorrelator for indicating the median frequency of an electrical signal having a broad frequency spectrum comprising, a balanced mixer, means for applying said electrical signal to said mixer, an adjustable oscillator having a direct current grid bias frequency control, means for applying the output of said oscillator to said mixer to produce a difference frequency signal, a time-delay line including a pair of terminals having a fixed-time delay therebetween, means for applying the output of said mixer to said time-delay line, a multiplier, circuit means for applying signals existing at each of said pair of terminals to said multiplier, an integrator connected to said multiplier for integrating the output thereof, means for controlling the grid bias of said oscillator by the output of said integrator, and an indicator connected to the output of said integrator.

8. An autocorrelator for automatically indicating the median frequency of an electrical signal having a broad frequency spectrum comprising, a balanced electronic mixer, means for applying said electrical signal to said mixer, an adjustable multivibrator oscillator having direct current positive grid bias frequency control, circuit means applying the oscillations of said oscillator to said mixer to form heterodyned products including a difference frequency signal, a multiplier, a fixed-time delay line having an input terminal and an output terminal, circuit means connecting said input and output terminals to said multiplier, circuit means connecting said mixer to said input terminal to apply said difference frequency product thereto, an integrator connected to said multiplier for integrating the output thereof, circuit means connecting the integrated output terminal of said integrator to the positive grid bias control of said multivibrator oscillator, and means for indicating said positive grid bias voltage.

References Cited in the file of this patent

UNITED STATES PATENTS

| | | |
|---|---|---|
| 2,065,565 | Crosby | Dec. 29, 1936 |
| 2,087,429 | Crosby | July 20, 1937 |
| 2,091,271 | Conklin | Aug. 31, 1937 |
| 2,273,110 | Kimball et al. | Feb. 17, 1942 |